United States Patent [19]

Ross

[11] Patent Number: 4,982,506
[45] Date of Patent: Jan. 8, 1991

[54] TURRET TOOL MEASURING DEVICE

[76] Inventor: Robert S. Ross, 6651 Etiwanda Ave., #11, Reseda, Calif. 91335

[21] Appl. No.: 435,665

[22] Filed: Nov. 13, 1989

[51] Int. Cl.$^5$ .................. B23Q 17/22; B27G 23/00
[52] U.S. Cl. .......................................... 33/626; 33/642
[58] Field of Search ............... 33/626, 642, 673, 613, 33/629; 82/159, 156, 153, 170, 903; 408/35

[56] References Cited

U.S. PATENT DOCUMENTS

| | | | |
|---|---|---|---|
| 904,007 | 11/1908 | O'Neill | 33/642 |
| 2,304,670 | 12/1942 | Argus | 33/673 |
| 2,341,875 | 2/1944 | Malik | 33/673 |
| 2,625,746 | 1/1953 | Rudhart | 33/642 |
| 3,069,781 | 12/1962 | Klaiban | 33/642 |
| 3,195,240 | 7/1965 | Parker | 33/613 |
| 3,981,211 | 9/1976 | Turner | 82/158 |

*Primary Examiner*—William A. Cuchlinski, Jr.
*Assistant Examiner*—C. W. Fulton

*Attorney, Agent, or Firm*—Rapkin, Gitlin, Moser & Schwartz

[57] ABSTRACT

A turret tool measuring device which includes an annular member shaped to enable it to fit easily and securely into the hub of a screw machine tool turret. A flange member formed integrally with the annular member, which together form the base element of the invention, cooperates to ensure that the annular member remains securely in the hub and the device is fully rotatable about the turret's central axis. The flange member includes the means to receive a rod member on which a guide member may be mounted. The guide member includes an opening conformed to slidably receive the rod member and an indicator arm extending therefrom. The guide member also includes a locking element adapted to fixedly secure the guide member to the rod when the device is in the process of measuring the longitudinal position of a turret tool.

5 Claims, 3 Drawing Sheets

TURRET TOOL MEASURING DEVICE

FIELD OF INVENTION

The present invention relates generally to the area of screw production machinery and more particularly to a device used in conjunction with the turret component on the machinery to measure the height or length of a tool used for such operations as shaping and forming metal rods and bars into such objects as screws and bolts.

DESCRIPTION OF THE PRIOR ART

Machines used for cutting and shaping metal bars and rods into screws, bolts and the like are well known in the prior art. A popular brand of machine in this category is the Brown and Sharpe Ultramatic R/S which, like other automatic screw machines of this type, includes a multi station turret that incorporates the means to accommodate often six (6) or more tools for such operations as turning, drilling, reaming, facing, knurling and threading metal rods and bars into screws, bolts and assorted other objects. As with any metal working tool of this type, continuous and direct contact with hard metal surfaces will eventually cause the tool to experience a considerable amount of wear, particularly at the head of the tool or point of contact. Breakage of the tool or tool head is also a problem and often results from the same constant and continuous wear. In either event, the tool must be replaced or repaired if it is to function properly. Repair or replacement, however, means removal of the tool from its mount and disturbance of the tool placement relative to the metal surface or object on which it was operating. Since the tolerances and distances relative to the tool head or cutting edge and the metal are extremely critical, the removal of the tool for any reason will necessitate time consuming and costly realignment of the tool when the repaired tool or the replaced counterpart is remounted in the turret.

Previous methods and devices for measuring the longitudinal positioning of the tool under these circumstances have included such items as a caliper type instrument, tape measure and even the conventional ruler. None of these devices, however, were sufficiently accurate so as to ensure that the longitudinal position of the repaired or replaced tool was identical to that of the original. The device of the present invention ensures this measurement. In particular, the present invention includes a base element comprised of an annular member having a tapered edge and an integrally formed flange member from which extends a rod on which a guide member, including a locking element, slides freely. The base element is formed to enable it to slip easily and securely into the hub of the turret, which may vary in diameter depending upon the nature and dimensions of the particular machine, and remain stable there while the appropriate longitudinal measurements are taken. The device is rotatable about the hub to allow it to position itself in longitudinal alignment with one or more of the tools mounted in the turret. The guide member may be moved along the rod until the bottom surface of the indicator arm extending from the guide comes into direct contact with the tool head. The guide is then fixed firmly into position using the locking element. Whether the device is then removed from the turret hub or left in place, the measured distance will remain the same so that when the tool is remounted in the turret, the critical alignment and tolerances will have been preserved.

Thus, an improvement offered by the device of the present invention is its simplicity of design and the ease and accuracy in which it performs its intended function.

The advantages and distinctions of the present invention over the prior art will become clearly evident in the following disclosure.

SUMMARY OF THE INVENTION

The present invention is a device which includes an annular member shaped to enable it to fit easily and securely into the hub of a screw machine tool turret. A flange member formed integrally with the annular member, which together form the base element of the invention, cooperates to ensure that the annular piece remains securely in the hub and the device is fully rotatable about the turret's central axis. The flange member includes the means to receive a rod member on which a guide member may be mounted. The guide member includes an opening conformed to slidably receive the rod member and an indicator arm extending therefrom. The guide member also includes a locking element adapted to fixedly secure the guide member to the rod when the device is in the process of measuring the longitudinal position of a turret tool.

Accordingly, an object of the present invention is to provide a device which accurately and consistently measures the longitudinal position of a turret tool.

Another object of the present invention is to provide a device that is convenient and easy to use and adaptable for use with turret hubs of various diameters.

Still another object of the present invention is to provide a device that is simple in design and inexpensive to manufacture.

Other objects and advantages of the present invention will become apparent in the following specifications when considered in light of the attached drawings wherein a preferred embodiment of the invention is illustrated.

A BRIEF DESCRIPTION OF THE DRAWINGS

DETAILED DESCRIPTION OF THE PREFERRED EMBODIMENT

Figure 1:
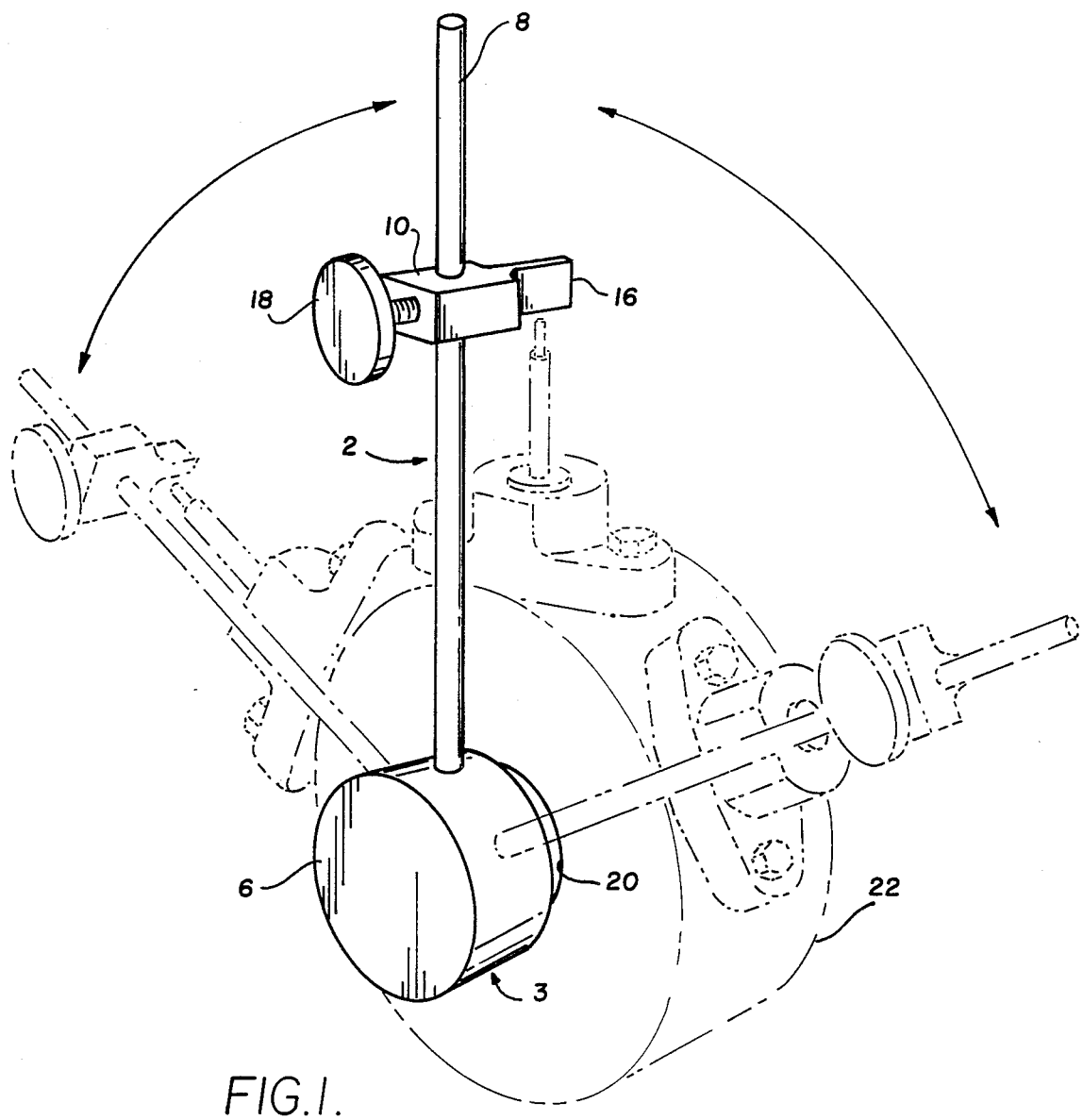
FIG. 1 is a perspective view of the turret tool measuring device of the present invention shown in conjunction with a conventional screw machine turret and a plurality of turret tools (shown in phantom).
Figure 2:
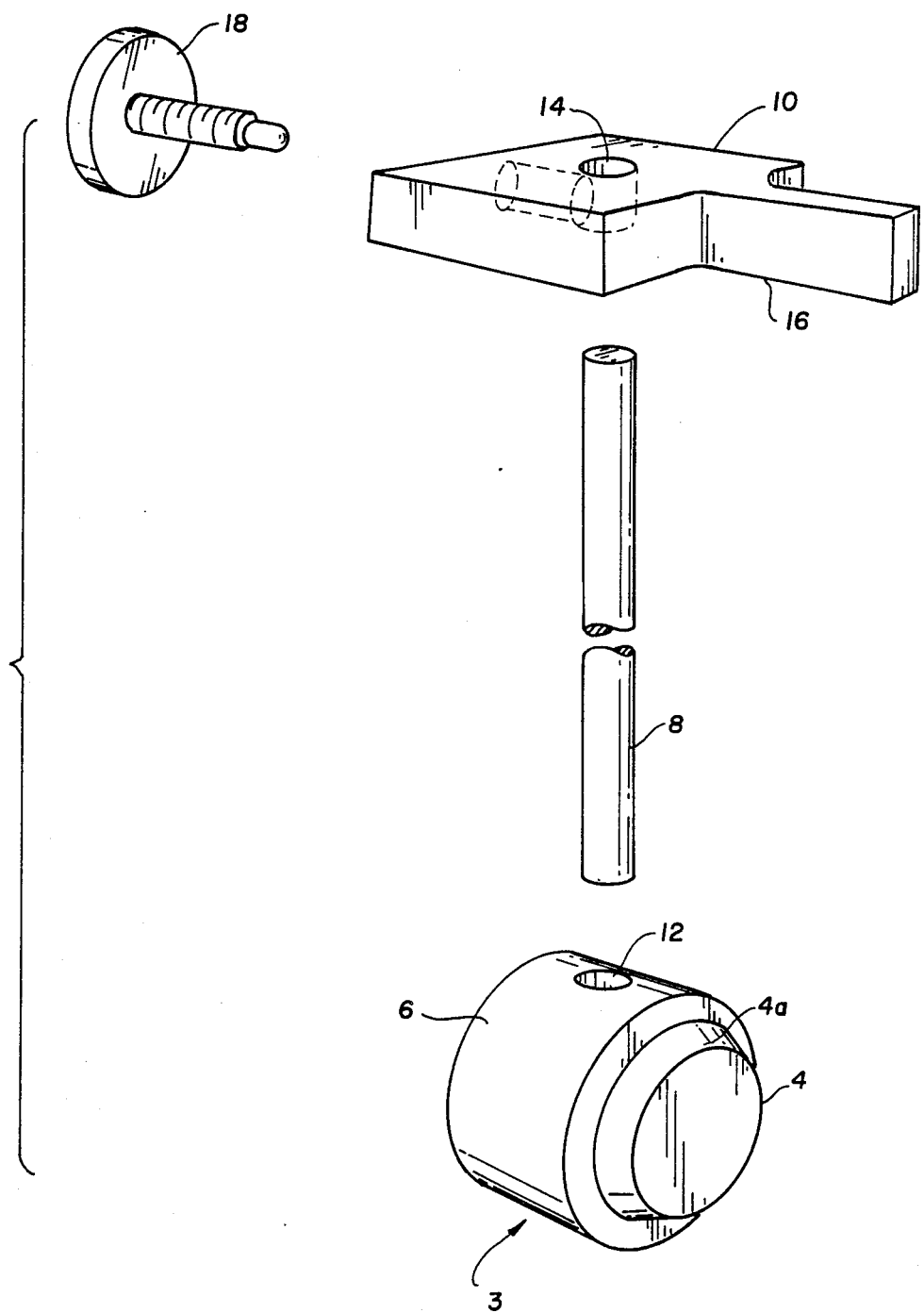
FIG. 2 is a perspective (exploded) view of the turret tool measuring device of the present invention shown according to its component elements.
Figure 3:
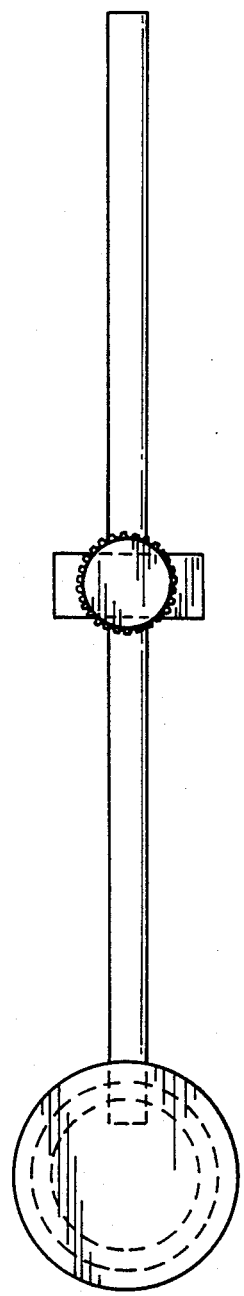
FIG. 3 is a rear elevational view of the turret tool measuring device of the present invention.
Figure 4:
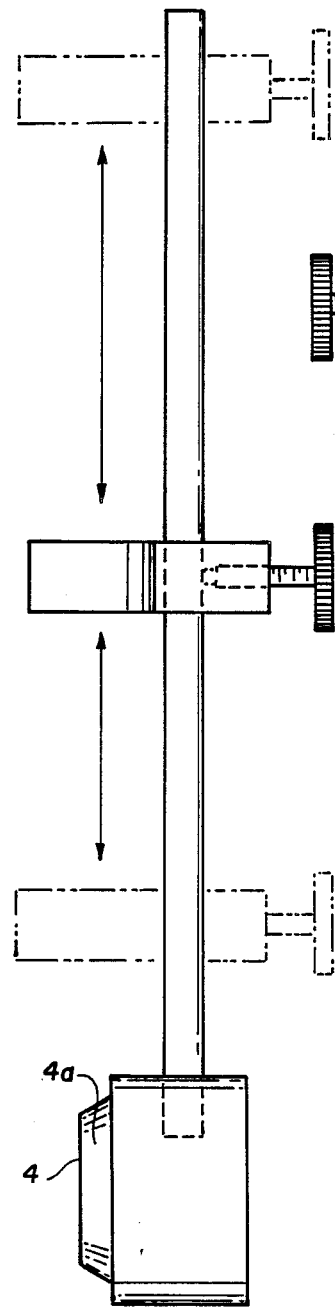
FIG. 4 is a side elevational view of the turret tool measuring device of the present invention depicting in phantom view selected movements of the guide member.
Figure 5:
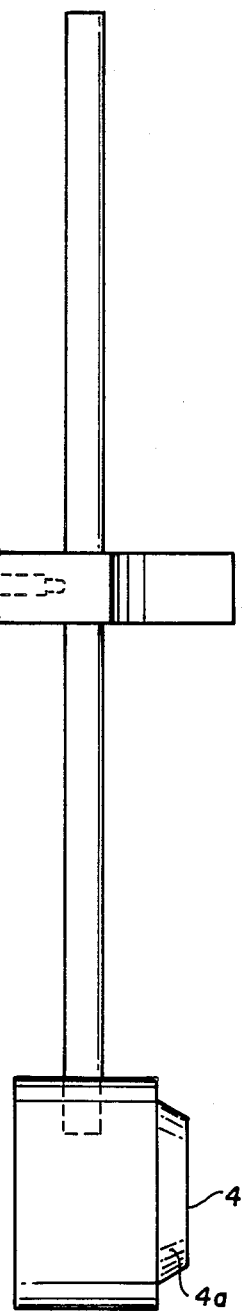
FIG. 5 is a side elevational view of the turret tool measuring device of the present invention from a perspective opposite to the one shown in FIG. 4.
Figure 6:
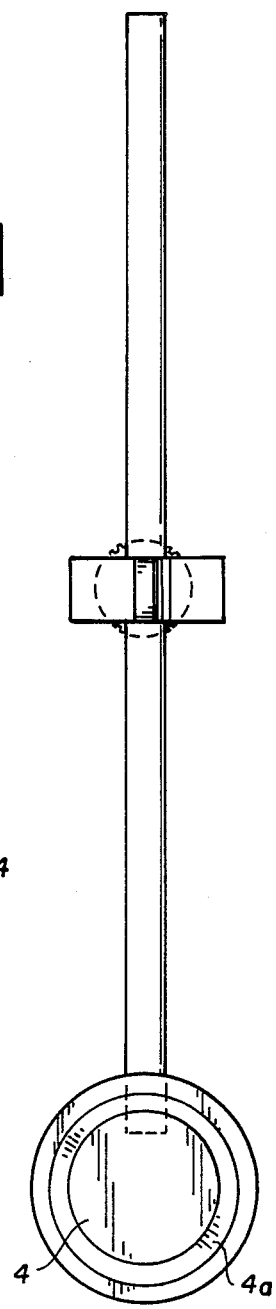
FIG. 6 is a front elevational view of the turret tool measuring device of the present invention.

Referring more particularly to the drawings, FIG. 1 is a perspective view of the turret tool measuring device 2 in accordance with the present invention. Device 2 is constructed of several components, including a base member 3, comprising an annular member 4 and a flange 6 formed integrally with member 4, a rod 8 and a guide member 10. Annular member 4 includes a circumferential tapered edge 4a which allows for adaptability of the invention to turret hubs which may vary in size. Flange 6 includes an opening 12 for receiving rod 8 in fixed relation therewith. Guide 10, which is normally manually operable, has an opening 14 therein conformed to slidably receive rod 8. Indicator 10 may include an arm 16, which extends from indicator 10 and is formed integrally therewith. Indicator 10 also includes cooperating locking element 18, which is adapted to fixedly secure indicator 10 to rod 8 at any point therealong.

Normal application of device 2 involves the secure placement of annular member 4 into the cooperating hub 20 of turret 22. Member 4 and flange 6, which are integrally formed and, thus, move in unison, are then rotated in the direction of the turret tool (shown in phantom) required to be measured. Rod 8 is aligned precisely along the longitudinal position of the tool whereupon guide 10 is then slid along rod 8 to the predetermined location, usually the tip or operating edge of the tool head. The bottom surface of arm 16 is then caused to contact the head or tip of the tool. Indicator 10 then is secured firmly into position by locking element 18. The measurement using the device of the present invention may be made when the tool is initially mounted in the turret or later, when repair or replacement becomes necessary. A dial indicator or similar measuring device may be used as an attachment to or otherwise in conjunction with the present invention to enhance the accuracy of the measurements.

Device 2 may be removed entirely from the turret hub or, alternatively, rotated away from the tool to permit the tool to be removed for repair or replacement. When the tool is remounted in the turret, device 2 may be refitted into hub 20 or, if already in place, rotated back into alignment with the longitudinal position of the tool. Using device 2, the tool may then be adjusted to conform to the height or length of the tool that existed before it was removed or when it was initially installed in the turret.

While the invention will be described in connection with a certain preferred embodiment it is to be understood that it is not intended to limit the invention to that particular embodiment. Rather, it is intended to cover all alternatives, modification and equivalents as may be included within the spirit and scope of the invention as defined by the appended claims.

I claim:

1. A measuring device for use in connection with a screw production machine, including a turret, a turret hub and a plurality of releasable turret tools, comprising:
   a. a slidingly insertable annular member for engaging the hub;
   b. a flange member formed integrally with said annular member, said flange member having a means therein to receive a rod member;
   c. a rod member insertable in said flange member;
   d. a guide means mountable on said rod member and having an opening therein conformed to slidably receive said rod member, said guide means including also an arm member extending therefrom and a cooperating locking element adapted to fixedly secure said guide means to said rod member.

2. The invention of claim 1 wherein the device is rotatable relative to said hub to enable said rod member to be in substantially radially aligned relation with one or more of said turret tools.

3. The invention of claim 1 wherein the guide means includes a cooperating threaded locking element adapted to be received by a threaded aperture in said guide means to fixedly secure said guide means to said rod member.

4. A measuring device for use in connection with a screw production machine, including a turret, a turret hub and a plurality of releasable tool elements, comprising:
   a. a slidingly insertable annular member for engaging the turret hub;
   b. a flange member formed integrally with said annular member, said flange member having a threaded means therein to receive a rod member having a cooperating threaded end portion;
   c. a rod member threadedly insertable into said flange member;
   d. a manually operable guide means mountable on said rod member and having an opening therein conformed to slidably receive said rod member, said guide means including also an arm member extending therefrom and a cooperating locking element adapted to fixedly secure said guide means to said rod member.

5. A measuring device for use in connection with a screw machine, including a turret, a turret hub and one or more turret tools, comprising:
   a. a base member, including a slidingly insertable annular member with a tapered circumferential edge for engaging the hub of the turret and a flange member formed integrally with said annular member, said base member having a means therein to receive a rod member;
   b. a rod member insertable in said base member;
   c. a guide means mountable on said rod member and having means associated therewith conformed to slidably receive said rod member, said guide means including also an element adapted to fixedly secure said guide means to said rod member.

* * * * *